United States Patent [19]

Kingswell et al.

[11] 4,059,727
[45] Nov. 22, 1977

[54] DATA TRANSMISSION SYSTEM BETWEEN TELEPHONE SUBSCRIBER LOCATION AND TELEPHONE EXCHANGE LOCATION DURING IDLE TELEPHONE CONDITION

[75] Inventors: Leonard William Kingswell, Uxbridge; Oliver Charles Matthews, Edgware, both of England

[73] Assignee: The Post Office, London, England

[21] Appl. No.: 756,004

[22] Filed: Jan. 3, 1977

[30] Foreign Application Priority Data

Jan. 9, 1976 United Kingdom .................. 848/76

[51] Int. Cl.² ......................................... H04M 11/00
[52] U.S. Cl. .............................................. 179/2 AM
[58] Field of Search ................. 179/2 R, 2 AM, 2 DP Primary Examiner—George G. Stellar
Attorney, Agent, or Firm—Cushman, Darby & Cushman

[57] ABSTRACT

An electrical data transmission system employs a telephone line to transmit data from a subscriber data equipment to a telephone exchange data equipment when the telephone line is idle. A first idle line sensing means is associated with the subscriber equipment and is operable to connect the line to the subscriber equipment when the line is idle and to disconnect the line from the subscriber equipment when the line is busy. A second idle line sensing means is associated with the exchange data equipment and is operable to connect the line to the exchange equipment when the line is idle and to disconnect the line from the exchange equipment when the line is busy.

15 Claims, 8 Drawing Figures

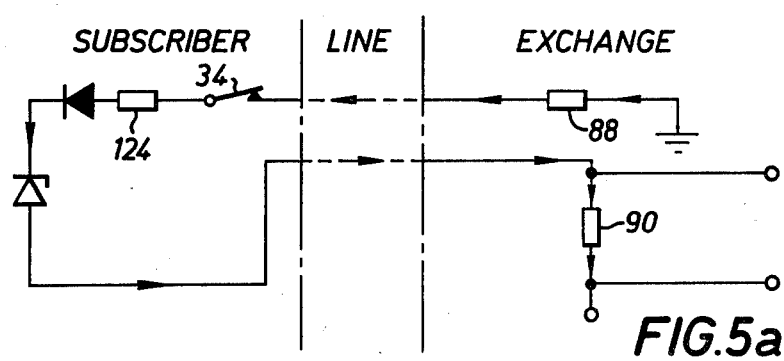
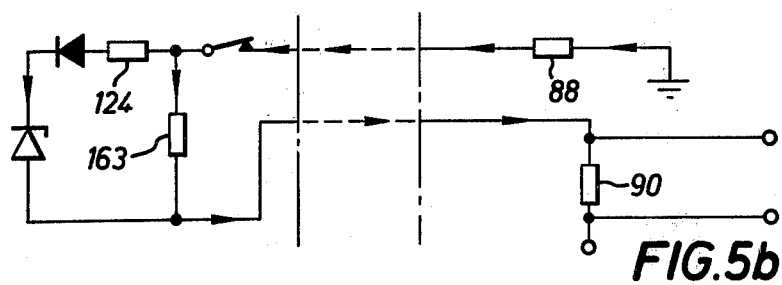
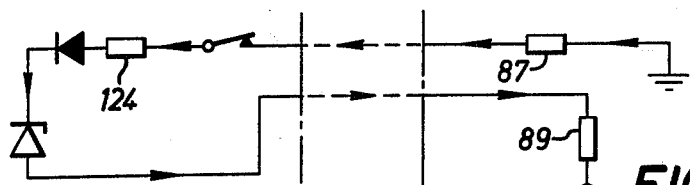
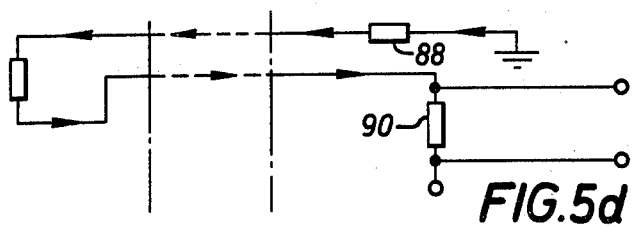

DATA TRANSMISSION SYSTEM BETWEEN TELEPHONE SUBSCRIBER LOCATION AND TELEPHONE EXCHANGE LOCATION DURING IDLE TELEPHONE CONDITION

This invention relates to electrical data transmission systems and has particular reference to such systems in which data is transmitted between a telephone subscriber's premises and an exchange via a telephone line.

Situations sometimes arise where small but regular packets of information require to be transmitted from a customer's premises to a central agency. Remote reading of domestic electricity and gas meters is a requirement of this type. Provision of a continuous transmission path either using carrier frequencies over the telephone pair or by means of a dedicated private circuit would be relatively costly while methods involving computer dialled access to the telephone line have certain service disadvantages.

The present invention is based on a preception of the fact that most telephone circuits are used only intermittently and would, during any 24 hour period, be idle for long enough to allow transmission of the type of information referred to above.

For the purposes of this specification the term "idle" as applied to a telephone line means that the circuit is not in use for normal telephone purposes and is not being tested.

According to the present invention there is provided a data transmission system for transmitting information over a telephone line comprising a line for connecting the telephone to a telephone exchange, first idle line sensing means associated with the subscriber end of the line and operable to connect the line to subscriber data equipment when the line is sensed to be in an idle condition and to disconnect the line from subscriber data equipment when the line is sensed to be in a busy condition, second idle line sensing means associated with the exchange end of the line and operable to connect the line to exchange data equipment when the line is sensed to be in an idle condition, and to disconnect the line from the exchange data equipment when the line is sensed to be in a busy condition, the arrangement being such that a data transmission circuit is established between the exchange data equipment and the subscriber data equipment when the line is in the idle condition.

The first idle line sensing means may include a solid state switch which is closed when the telephone line is idle and said second idle line sensing means includes voltage sensing means for sensing the voltage level on said telephone line, said voltage sensing means being operable to control energisation and de-energisation of a relay whose contacts are connected to the line.

The subscriber data equipment may include means for storing data to be transmitted and control means responsive to command signals from the exchange equipment to cause said storing means to release data for transmission to the exchange equipment. The exchange data equipment may include means for generating command signals for transmission to said control means and means for receiving data transmitted from said storing means. The storing means may include at least one binary counter arranged to store data indicative of the reading of a domestic meter. The storing means may include a plurality of binary counters each associated with a domestic means, and said control means includes means for selecting which is to be read.

The or each binary counter may have an associated shift register for converting signals from parallel to serial form.

The subscriber data equipment may include a line current detector for detecting the current level on the telephone line, said control means being responsive to said current detector. The line current detector may comprise a differentiating circuit and a first monostable circuit. The control means includes second and third monostable circuits responsive to said first monostable circuit, and a bistable circuit responsive to said second and third monostable circuits.

The subscriber data equipment may include a current modulator operable to modulate the current on the line in response to signals from the or each shift register.

The command signal generating means may include a current modulator for modulating the current level on the telephone line in response to clock signals received from a data reading equipment. The current modulator may comprise a pair of switching transistors which are arranged to switch states in response to said clock signals to vary the resistance connected in series with the telephone line.

The voltage sensing means of the second idle line sensing means may include at least one switching transistor and means responsive to the output of said transistor to control energisation of said relay.

The data receiving means may include a switching transistor and a storing means responsive to the output of said switching transistor.

The subscriber data equipment may be supplied with power from the exchange via the telephone line when the line is connected to the subscriber data equipment by the first idle line sensing means.

The invention will be described now by way of example only with particular reference to the accompanying drawings. In the drawings.

Figure 1:
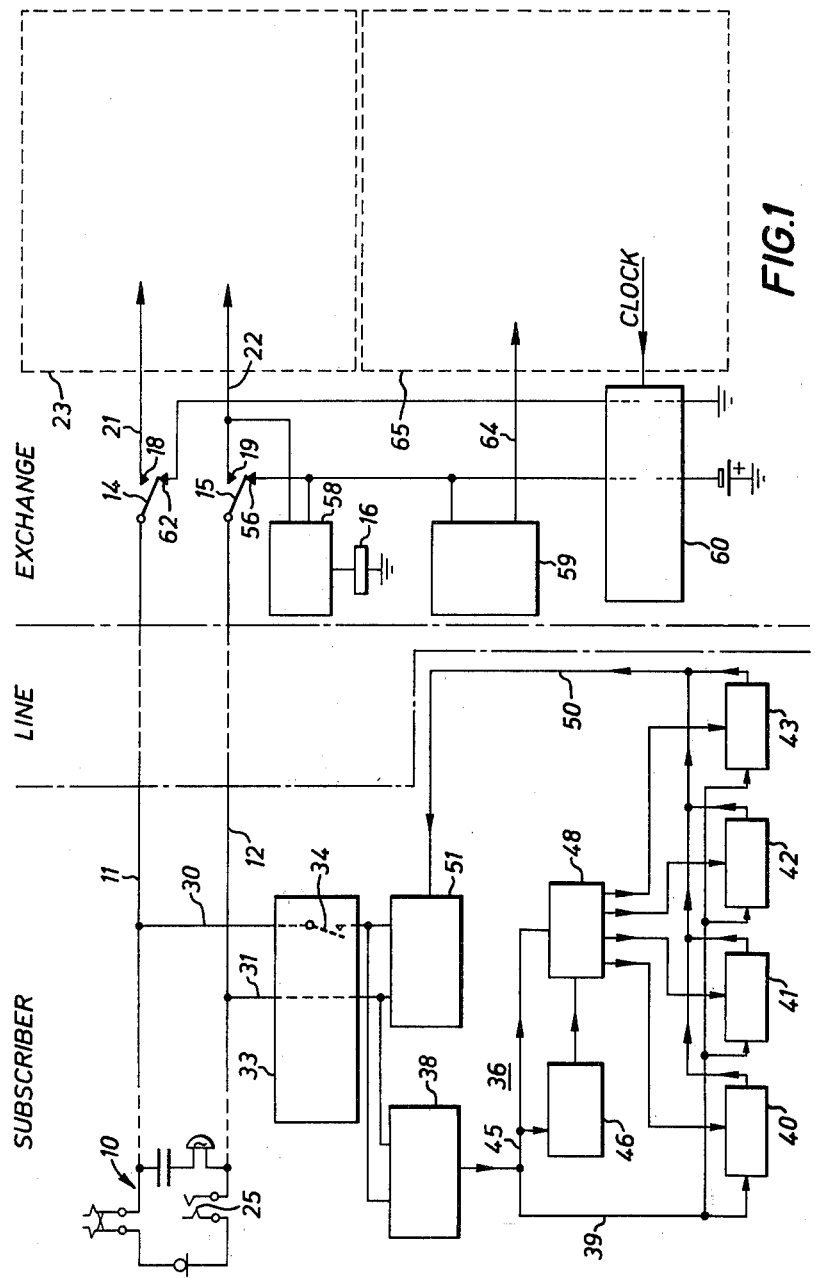
FIG. 1 is a block schematic diagram of a data transmission system in accordance with the present invention.

Referring to FIG. 1 a subscriber's telephone 10 is connectable by a pair of telephone lines 11, 12 to a pair of movable contacts 14, 15 of a changeover relay 16. Fixed contacts 18, 19 of the relay 16 are connected by lines 21, 22 and a conventional line relay (not shown) to a telephone exchange 23. The telephone 10 includes a handset actuable gravity switch 25 which ensures that there is no d.c. path through the telephone line when the telephone is not in use.

The lines 11, 12 are connected by lines 30, 31 to an idle line detector and switch control 33 which includes a solid state switch 34. The line detector 33 is connected to subscriber data equipment 36. The subscriber data equipment 36 comprises a line current detector 38 which is connected by a line 39 to the clock input of each of four parallel in serial-out 8-bit shift registers 40 to 43, and by a line 45 to a control circuit 46 and a meter select circuit 48. The control circuit 46 is connected to the meter select circuit 48 and the meter select circuit 48 is connected to each of the shift registers 40 to 43. Each shift register has an output which is connected by a line 50 to a line current modulator 51.

Each of the shift registers 40 to 43 is connected to receive signals from an associated binary counter (not shown). Each binary counter is arranged to store the reading of a domestic meter e.g. electricity meter, in the form of six bit binary words. In order to achieve this a special type of meter has to be used. The meter is provided with a contact which is operable to give an output pulse whenever a unit is recorded by the meter. The pulse is applied to the binary counter. The shift register associated with each binary counter converts the parallel output data of the binary counter into serial form.

At the exchange end of the lines 11, 12, fixed contact 56 of the relay 16 is connected to an idle line detector 58, to a line current detector 59 and to a line current modulator 60. A fixed contact 62 is also connected to the line current modulator 60. The idle line detector 58 is connected via the relay 16 to earth. The line current detector 59 has an output 64 which is connected to a meter reading equipment 65 which is located at the telephone exchange and is common to a number of subscriber lines. The equipment 65 can provide a clock input for the line current modulator 60.

In operation of the system shown in FIG. 1 when the telephone 10 is not in use (switch 25 is open) the contacts 14, 15 of the relay 16 are in the position shown in FIG. 1 and the switch 34 is closed. Hence a circuit is established for transmitting data from the subscriber data equipment 36 via the lines 11, 12 to the common meter reading equipment 65.

Figure 2:
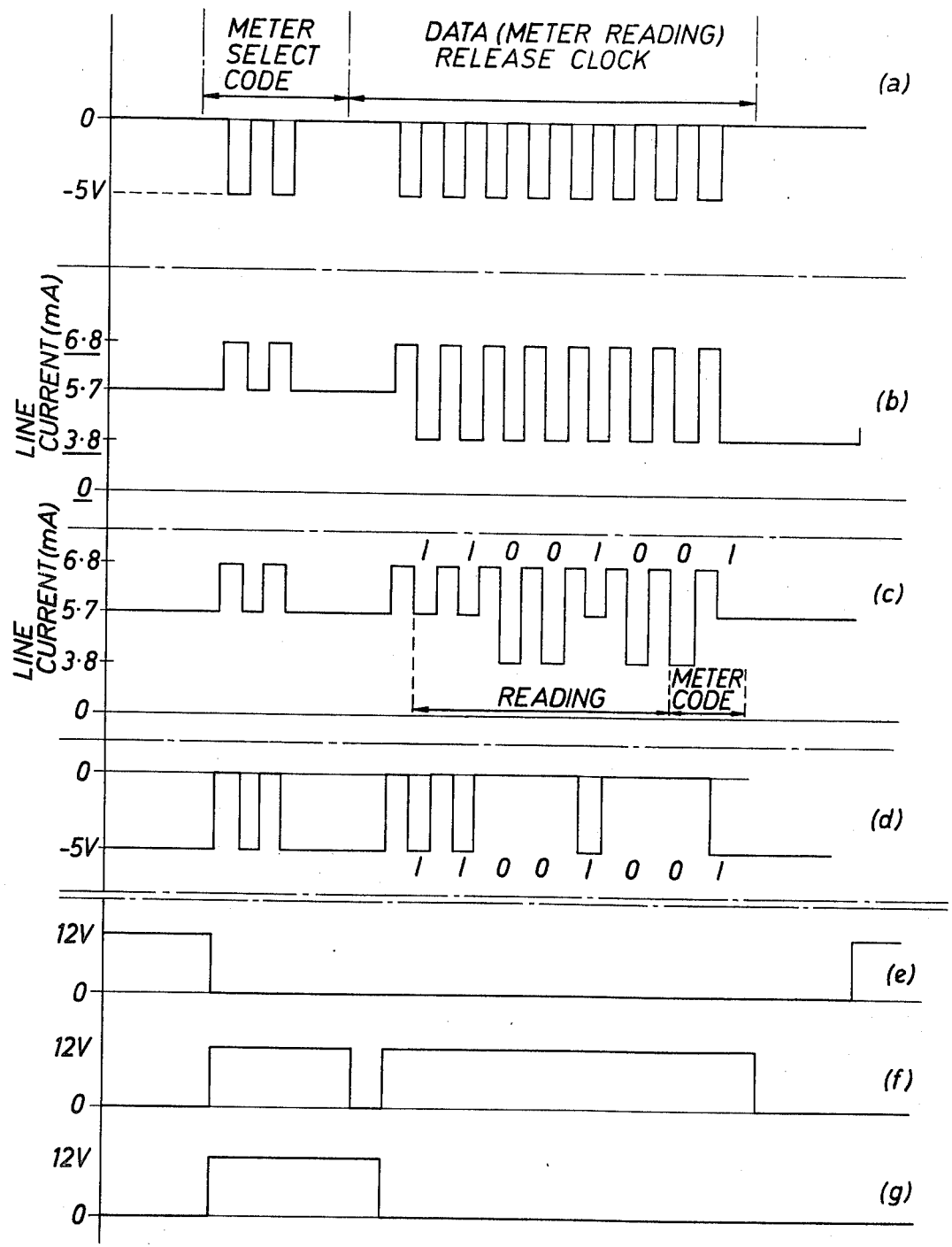
FIG. 2 is a waveform diagram showing different waveforms used in the system.

The common equipment 65 selects that line on which it wishes to read a meter and generates a waveform as shown in FIG. 2(a). This waveform is used to drive line current modulator 60. The first part of the waveform forms a command part and constitutes a code for selecting which of the meters at the subscriber's equipment is to be read. The second part of the waveform is for clocking the selected shift register in the subscriber equipment for the return of the meter reading. The waveform is transmitted from the modulator 60 along the lines 11, 12 to the subscriber equipment. The current waveforms present on the line during these operations are shown in FIGS. 2(b) and 2(c).

The subscriber equipment 36 responds to line current pulses and regenerates them into voltage pulses by means of a differentiator and a monostable. The control circuit 46 ensures that the correct equipment responds to the correct parts of the waveform. The meter select circuit 48 counts the meter code pulses so that the correct shift register 40 to 43 is selected.

Parallel data is fed into the selected shift register and clocked out serially into the line current modulator 51. The signals from the modulator 51 are fed via the lines 11, 12 to the exchange equipment where they generate a serial data output on the output 64, the serial output being fed into the meter reading equiment 65. In the case of electricity meter readings the data output is connected into common processing equipment 65 and put into a form suitable for retransmission to the billing authority.

The serial output of the selected shift register control the effective resistance of the subscriber equipment to line and a logic "1" on the output causes this resistance to be lower than with a logic "0" output. The current levels caused by this are detected as logic levels in the exchange equipment and the serial form data sent onto the common reading equipment. This stores the data in a shift register which is clocked synchronously with the data release clock being supplied to the exchange equipment.

The data transmission speed of the system is 125 input pulses per second.

Lifting of the handset of the telephone 10 closes the switch 25 and establishes a calling loop thereby reducing the current through the detector 33. This causes disconnection of the subscriber data equipment 36 by opening of the switch 34. The loop condition is also sensed by the detector 58 at the exchange end of the line. The relay 16 is de-energised and normal exchange conditions exist. Guard circuits (not shown) prevent premature reconnection of the data circuit during dialling.

Incoming calls are detected by the detector 58 which causes the relay 16 to be de-energised thus allowing ringing to be extended to the lines 11, 12. During ringing the line current falls sufficiently to cause the subscriber data equipment 36 to be disconnected by the detector 33. Line testing is also recognised by the detectors 33 and 58 so that during both manual and automatic testing the subscriber data equipment 36 is disconnected allowing normal calling condition to prevail.

Figure 3:
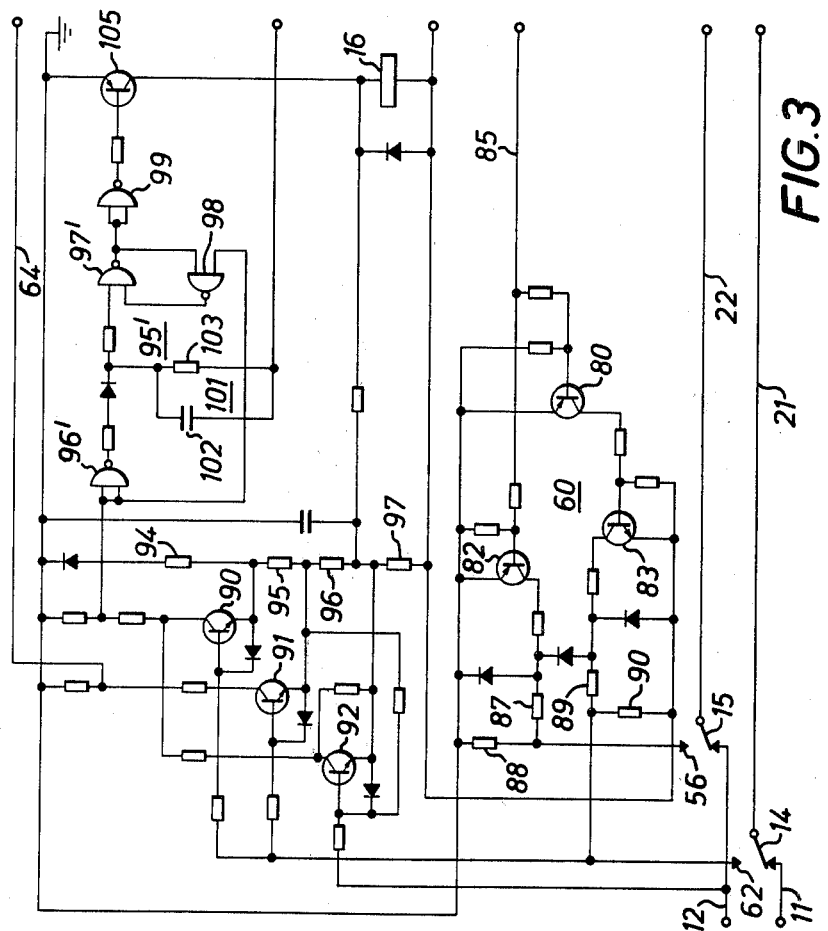
FIG. 3 is a detailed circuit diagram of part of the system of FIG. 1.

The exchange equipment is shown in more detail in FIG. 3. The current modulator 60 comprises an inverting transistor 80 and two switching transistors 82 and 83. The transistors 82, 83 are arranged to switch in response to clock signals fed along the line 85 from the common reading equipment 65. The collector circuit of each of the transistors 82, 83 includes two resistors 87, 88 and 89, 90. The resistance of each resistor 87, 89 is 200 Ω and that of each resistor 88, 90 is 2.4KΩ.

When the modulator 60 is receiving clock pulses and the clock input is at zero volts (see FIG. 2(a)) all three transistors 80, 82 and 83 are non-conductive. The total series resistance connected to the telephone line is 4.8KΩ. When the clock input is at −5V the transistors 82 and 83 saturate so that the resistors 88, 90 are shunted by the resistors 87, 89. The total series resistance connected to line is then 400Ω. Thus it will be seen that the current modulator 60 switches the total resistance in series with line between two values, 400 Ω and 4.8KΩ, as clock pulses are applied to it. The arrangement is such that the line is balanced during switching, i.e., an equal resistance is connected to each of the lines 11, 12. This arrangement is used to reduce interference with other lines in the same distribution cable.

The line current detector 59 and idle line detector 58 comprises three switching transistors 90, 91 and 92. The emitters of the transistors 90 to 92 are connected to different points on a voltage divider consisting of resistors 94, 95, 96 and 97. Each transistor 90 to 92 is arranged to switch when a predetermined potential is applied to its base. The transistor 90 is arranged to detect a loop on the line indicating that a subscriber wishes to make a call. The transistor 91 is arranged to respond to data signals transmitted from the subscriber equipment during idle line conditions and the transistor 92 is arranged to detect an incoming call from the exchange.

The collector circuit of the transistor 91 is connected to the output 64 which feeds into the common meter reading equipment 65. The collector circuit of each of the transistors 90 and 92 is connected to a gate control circuit 95' which comprises four NAND gates 96', 97', 98 and 99. The circuit 95 also includes a delay element 101 comprising a capacitor 102 connected in parallel with a resistor 103. The output of the gate control circuit 95' is connected to the base of a transistor 105 the collector circuit of which includes the coil of the relay 16. The arrangement is such that when the telephone line is idle the transistor 105 is conductive and the relay coil 16 is energised. In this condition the movable contacts 14, 15 of the relay 16 connect the exchange equipment to the lines 11, 12. When the line is not idle the transistor 105 is non-conductive and the relay 16 de-energised. In this condition the movable contacts 14, 15 are in the position shown in FIG. 3. The line current detector operates by detecting the different voltage drops across the resistor 90.

In operation when the telephone line is idle the transistors 90 and 92 are non-conductive and the transistor 105 is conductive. The exchange equipment is thus connected to the lines 11, 12. If data in the form of a waveform such as that shown in FIG. 2(c) is transmitted along the line from the subscriber's equipment the transistor 91 responds by switching states as the waveform changes from a high to low level and vice versa. With reference to FIG. 2(c) the threshold level of the transistor 92 is set between 3.8mA and 5.7mA. The potential at the collector of the transistor is thus continually changing (see FIG. 2(d)) and this information is recorded by the common equipment 65.

If the subscriber lifts his handset to make a call, a loop is established on the line. The line current increases causing the transistor 90 to switch. The gate control circuit 95' responds and applies a signal to the base of the transistor 105 which is substantially immediately rendered non-conductive so that the exchange equipment is disconnected from the lines 11, 12. A similar situation occurs when an incoming call is sensed. In this case the transistor 92 switches to render the transistor 105 non-conductive.

When the subscriber replaces the handset the transistor 90 is switched back to its original state. There is a delay, provided by the delay element 101, before the transistor 105 becomes conductive again to connect the exchange equipment to the lines 11, 12. Typically this delay is of the order of 30 seconds.

Figure 4:
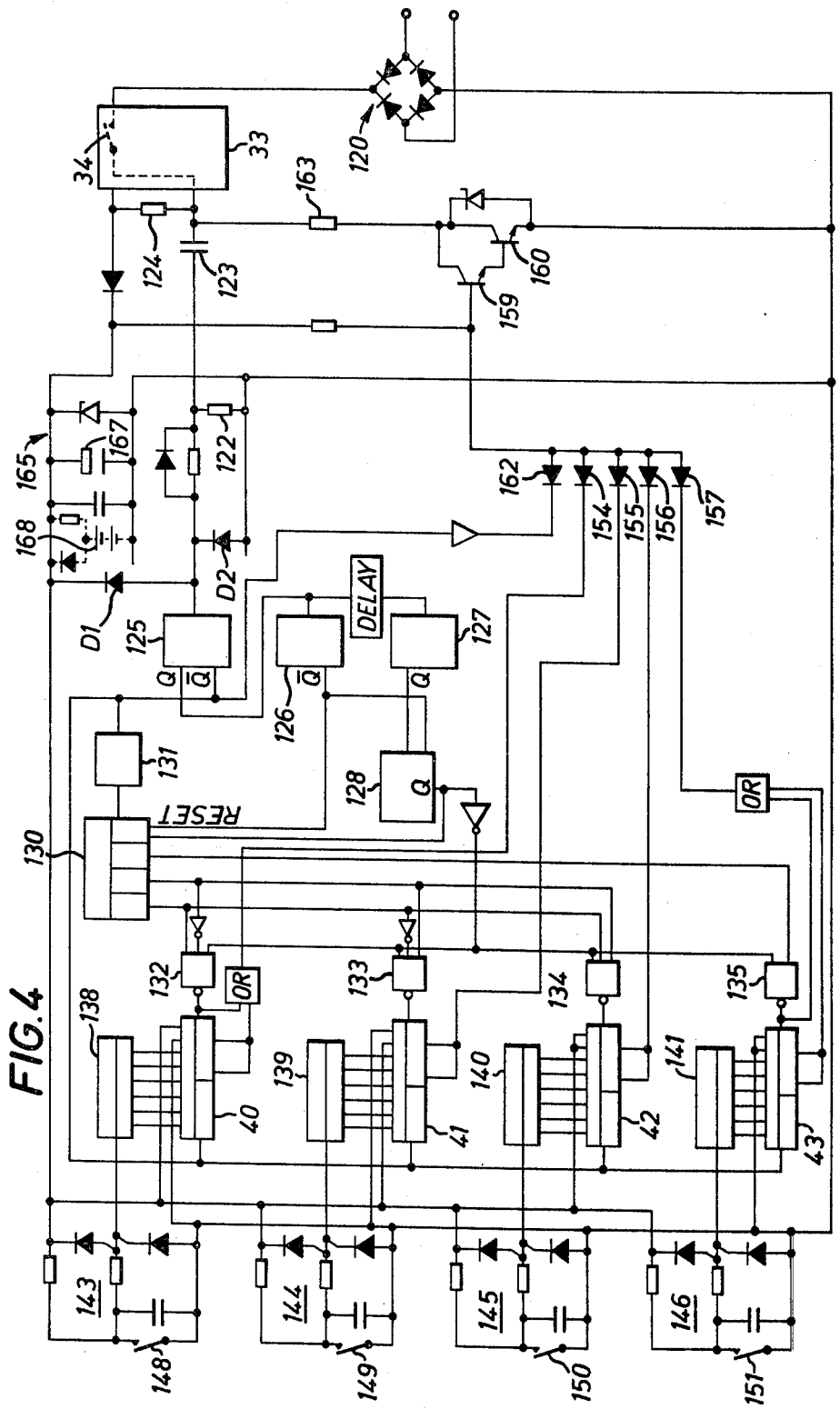
FIG. 4 is a detailed circuit diagram of another part of the system of FIG. 1, and FIGS. 5a to 5d are diagrams illustrating transmission paths existing in the system of FIG. 1.

The subscriber equipment is shown in more detail in FIG. 4. The equipment is connected to the line by a rectifier bridge 120. The rectifier bridge 120 is connected via the idle line detector 33 and solid state switch 34 and a resistor 124 to the line current detector 38 which comprises a differentiator network consisting of a resistor 122 and a capacitor 123 and a monostable circuit 125. Diodes D1 and D2 act as protectors.

The control circuit 46 comprises monostable circuits 126 and 127 and a bistable circuit 128. The meter select circuit 48 comprises a meter select counter 130 which is connected to the monostable 125 by a delay 131. The counter 130 is connected to the shift registers 40 to 43 via NAND gates 132 to 135. The binary counters associated with each shift register 40 and 43 are shown at 138 to 141 and the meters whose readings are to be recorded are shown at 143 to 146. Each meter has a contact 148 to 151 which is actuated each time a unit is recorded by the meter.

The outputs of the shift registers 40 to 43 are connected via diodes 154 to 157 to the line current modulator 51 which comprises a Darlington transistor pair 159, 160. The Q output of the monostable 125 is connected by a diode 162 to the Darlington pair. The output of the Darlington pair is connected via a resistor 163 and the switch 34 to the telephone line. The circuit shown in FIG. 4 uses Complementary MOS logic which gives very low power consumption.

Power for the circuit is derived from the exchange equipment and is stabilised by a voltage stabiliser 165. The voltage stabiliser 165 includes a high capacitance capacitor 167 which stores up sufficient charge to power the counters 138 to 141 for approximately one minute if the power line is disconnected. A battery 168 is provided to provide power for the counters 138 to 141 so that they retain their reading when the line is busy for a long period.

The detailed circuitry for the idle line detector 33 and solid state switch 34 has not been given. Suitable circuits are described in U.K. Patent Specification No. 1,387,565.

In operation when the telephone line is idle, a waveform transmitted from the exchange equipment is detected by the differentiator 122, 123. The differentiated signal triggers the monostable 125. The control monostables 126 and 127 are triggered from the Q output of the monostable 125. The monostable 126 remains triggered throughout the entire pulse train while the monostable 127 is triggered only throughout each part of the pulse train. The output of the monostables 126 and 127 are shown in FIGS. 2(e) and 2(f) respectively.

The Q output of the monostable 125 provides the clock signal for the equipment. This signal is an inversion of the waveform fed along the lines 11, 12 and the shift registers 40 to 43 and counter 130 respond to its rising edge.

The Q output of the monostable 126 is used as a reset for the equipment which is only removed for the duration of the pulse train from the exchange equipment. The Q output of monostable 127 is used to clock the bistable 128 which gives a "1" output after the first output pulse and a "0" after the second. The output of the bistable 128 provides a control signal for the counter 130 and for decoding the gates 132 to 135. The delay 131 is to prevent the counter 130 clocking on the falling edge of a control pulse from the bistable 128 when the clock input is at "0" during the first data release pulse.

The outputs of the meter select pulse counter 130 are decoded by the gates 132 to 135 which are strobed by the inverted output of the bistable 128. The shift register associated with the selected meter is then ready to release data on receipt of the data release pulse train.

Each shift register 40 to 43 has a control which changes it from a parallel to a serial mode by application of a logic "0". This is the method by which the desired shift register is selected. The clock has no effect on a shift register when it is in a parallel mode.

On selection of a shift register, its reading is clocked out. The first bit is the most significant bit of the meter reading and the sixth bit the least significant. The seventh and eighth bits form the meter code which is different for each meter. This serves as a check for the common equipment that it has obtained and read the correct meter. As the shift registers are clocked before the first bit is read, the data in the register is set initially one step behind. To achieve the necessary re-writing for this operation, and to allow the reading to be taken more than once, the output is connected back to the serial input of the register.

The output of each shift register, and the clock, are each connected to one input of the NAND gate formed by the five diodes 154 to 157 and 162, and the Darlington transistor pair 159, 160. This gate, when on, connects the shunting resistor 163 in parallel with the equipment and thus transmits a "1" to line by allowing a higher current to flow. The clock input to the gate prevents it being on during a high current clock pulse from the exchange equipment. The inputs from the shift registers that are not selected are all at logic "1". When a "0" is present on the output of the selected shift register, the output gate is off and a "0" is transmitted. When a "1" is present the gate is on, and a "1" is transmitted. The RC networks around the meter contacts 148 to 151 are contact bounce suppressors.

The operation of the equipment is such that the number of meters that can be selected and read can be readily increased with the addition of extra counters and extra, or longer, shift registers. Extra decoding gating on the meter select counter would also be required. The meter selection outputs can also be used, with the addition of four logic elements, to control equipment such as heaters and other electrical loads on the subscribers's premises, providing the necessary power switching equipment is supplied.

Simpler arrangements for reading a lower number of meters can also be provided. If only one meter is to be read it is not necessary to have meter selection signals.

It will be seen that the present system uses d.c. signalling with commands being sent from the exchange unit in the form of current pulses and the information being returned as one of two current levels. There are three current levels present on the line during signalling and these are shown in the following table.

| Condition No | Exchange Equipment Output Resistance | Subscriber Equipment Input Resistance | Condition |
| --- | --- | --- | --- |
| 1 | High (4.8 kohm) | High | "0" transmitted from subs unit |
| 2 | High (4.8 kohm) | Low | "1" transmitted from subs unit |
| 3 | Low (4.8 kohm) | High | Clock pulse from exchange unit |

The transition to condition 3 from condition 1 or 2 provides the clock to the subscriber equipment. The condition of exchange equipment output impedance low and subscriber equipment impedance low does not occur. FIG. 5 shows the signalling current path through the two equipments. FIG. 5 (a) shows the condition when a logic "0" is transmitted, FIG. 5(b) the condition when a logic "1" is transmitted, FIG. 5(c) the condition when a clock signal is transmitted from the exchange, and FIG. 5(d) the condition when a loop exists due to the subscriber lifting his handset.

Possible applications of the system are for the transmission of remote indications of water levels, flow rates, alarms, data from TV audience research recorders. In the reverse direction the customer's exchange meter reading could be transmitted. A simplified version could be arranged to give indication of line fault conditions during the time the telephone is not in use.

We claim

1. A data transmission system for transmitting information over a telephone line comprising a line for connecting the telephone to a telephone exchange, first idle line sensing means associated with the subscriber end of the line and operable to connect the line to subscriber data equipment when the line is sensed to be in an idle condition and to disconnect the line from subscriber data equipment when the line is sensed to be in a busy condition, second idle line sensing means associated with the exchange end of the line and operable to connect the line to exchange data equipment when the line is sensed to be in an idle condition, and to disconnect the line from the exchange data equipment when the line is sensed to be in a busy condition, the arrangement being such that a data transmission circuit is established between the exchange data equipment and the subscriber data equipment when the line is in the idle condition.

2. A data transmission system as claimed in claim 1, wherein said first idle line sensing means includes a solid state switch which is closed when the telephone line is idle and said second idle line sensing means includes voltage sensing means for sensing the voltage level on said telephone line, said voltage sensing means being operable to control energisation and de-energisation of a relay whose contacts are connected to the line.

3. A data transmission system as claimed in claim 2, wherein said voltage sensing means includes at least one switching transistor and means responsive to the output of said transistor to control energisation of said relay.

4. A data transmission system as claimed in claim 1, wherein the subscriber data equipment includes means for storing data to be transmitted and control means responsive to command signals from the exchange equipment to cause said storing means to release data for transmission to the exchange equipment.

5. A data transmission system as claimed in claim 4, wherein said storing means includes at least one binary counter arranged to store data indicative of the reading of a domestic meter.

6. A data transmission system as claimed in claim 5, wherein said storing means includes a plurality of binary counters each associated with a domestic means, and said control means includes means for selecting which is to be read.

7. A data transmission system as claimed in claim 5, wherein the or each binary counter has an associated shift register for converting signals from parallel to serial form.

8. A data transmission system as claimed in claim 7, including a current modulator operable to modulate the current on the line in response to signals from the or each shift register.

9. A data transmission system as claimed in claim 4, wherein said subscriber data equipment includes a line current detector for detecting the current level on the telephone line, said control means being responsive to said current detector.

10. A data transmission system as claimed in claim 9, wherein said line current detector comprises a differentiating circuit and a first monostable circuit.

11. A data transmission system as claimed in claim 10, wherein said control means includes second and third monostable circuits responsive to said first monostable circuit, and a bistable circuit responsive to said second and third monostable circuits.

12. A data transmission system as claimed in claim 4, wherein the exchange data equipment includes means for generating command signals for transmission to said control means and means for receiving data transmitted from said storing means.

13. A data transmission system as claimed in claim 12, wherein said data receiving means includes a switching transistor and a storing means responsive to the output of said switching transistor.

14. A data transmission system as claimed in claim 12, wherein said command signal generating means includes a current modulator for modulating the current level on the telephone line in response to clock signals received from a data reading equipment.

15. A data transmission system as claimed in claim 14, wherein said current modulator comprises a pair of switching transistors which are arranged to switch states in response to said clock signals to vary the resistance connected in series with the telephone line.

* * * * *